(12) United States Patent
Golota et al.

(10) Patent No.: US 6,544,486 B2
(45) Date of Patent: Apr. 8, 2003

(54) OZONE GENERATOR

(76) Inventors: Volodymyr Golota, 11 Ak. Lyapunova Str., apt. 54, Kharkov (UA), 61166; Oleksiy Yegorov, 3 Entuziastov Str., apt 6, Kharkov (UA), 61108; Valeriy Mykhaylov, 21a Ak. Valtera Str., apt 101, Kharkov (UA), 61108; Volodymyr Mukhin, 12 Kurchatova Avenue, apt. 195, Kharkov (UA), 61108; Grygoriy Taran, 26 Arkhitectorov Str., apt. 1, Kharkov (UA), 61174; Sergiy Shilo, 38 Barabashova Str., apt. 35, Kharkov (UA), 61168

( * ) Notice: Subject to any disclaimer, the term of this patent is extended or adjusted under 35 U.S.C. 154(b) by 60 days.

(21) Appl. No.: 09/752,366

(22) Filed: Dec. 29, 2000

(65) Prior Publication Data

US 2002/0085962 A1 Jul. 4, 2002

(51) Int. Cl.⁷ ................................................ B01J 19/08
(52) U.S. Cl. .................................................. 422/186.18
(58) Field of Search ......................... 422/186.07, 186.18

(56) References Cited

U.S. PATENT DOCUMENTS 4,159,971 A * 7/1979 Gneupel ................. 422/186.07
5,002,738 A * 3/1991 Pin et al. ................ 422/186.07

* cited by examiner

*Primary Examiner*—Kishor Mayekar

(57) ABSTRACT

Ozone is generated by directing ambient air through a co-axially oriented cathode and anode. In a preferred embodiment, the outer electrode is a tubular cathode, with the anode disposed about a longitudinal axis therein. The anode is provided with a plurality of vane assemblies, with each individual vane canted at an angle of from about 15° to about 70°, and preferably about 45°, to the planar body of the vane assembly. Air flow is provided either coincident with the longitudinal axis, or tangentially thereto.

4 Claims, 4 Drawing Sheets

– 1 –

OZONE GENERATOR

FIELD OF THE INVENTION

The present invention relates to ozone generators, and more specifically, an ozone generator capable of producing at least 10 grams of ozone per hour when operated on ambient air.

BACKGROUND OF THE INVENTION

Ozone is well known as a disinfectant and a potent oxidant. It is used in such applications as a water treatment, cooling tower, odor control agent, agriculture/aquaculture and other industrial applications. The generation of ozone for commercial purposes may be accomplished in a number of well-known methods, including corona discharge. Ozone generators have been well known, and various embodiments have been well documented. For example, U.S. Pat. No. 4,079,260 discloses an ozone generator having parallel mounted ozonizing elements, each consisting of water-cooled inner and outer electrodes mounted coaxially with a constant gap through which passes the gas to be treated and in which an electric discharge is initiated. Cooling chambers communicate with gaps between adjacent ozonizing elements. As another representative example, U.S. Pat. No. 6,027,701 discloses an ozone genertor having a cylindrical tube ground electrode with a dielectric on an inner peripheral surface for communicating a feed gas chamber with an ozonized gas chamber. A hollow cylindrical high voltage electrode with a predetermined discharge gap is disposed concentrically with the cylindrical ground electrode. Cooling water is supplied to a water jacket surrounding the ground electrode. The cylindrical tube ground electrode and the hollow cylindrical high voltage electrode define the ozone generating tube. As a final example of well-known ozone generators, ozone generated by injection of oxygen or oxygen enriched air into a corona discharge zone formed between concentric inner tubular electrode/dielectric and outer tubular electrodes is disclosed in U.S. Pat. No. 6,139,809.

The treatment of foods with ozone is also well known, as evidenced by U.S. Pat. No. 6,086,833, wherein low pressure ozone gas is delivered to a food product by an injector.

SUMMARY OF THE INVENTION

It is highly desirable that any ozone generator be capable of utilizing ambient air, such that expensive pretreatment of feed air not be required. Heretofore, ozone generators have been extremely susceptible to moisture in the air feed, as water vapor in the air may cause unwanted sparking. The high temperatures created in ozone generators may cause the creation of nitric acid, which is deleterious to the longevity of such devices.

DETAILED DESCRIPTION OF THE DRAWINGS

Figure 1:
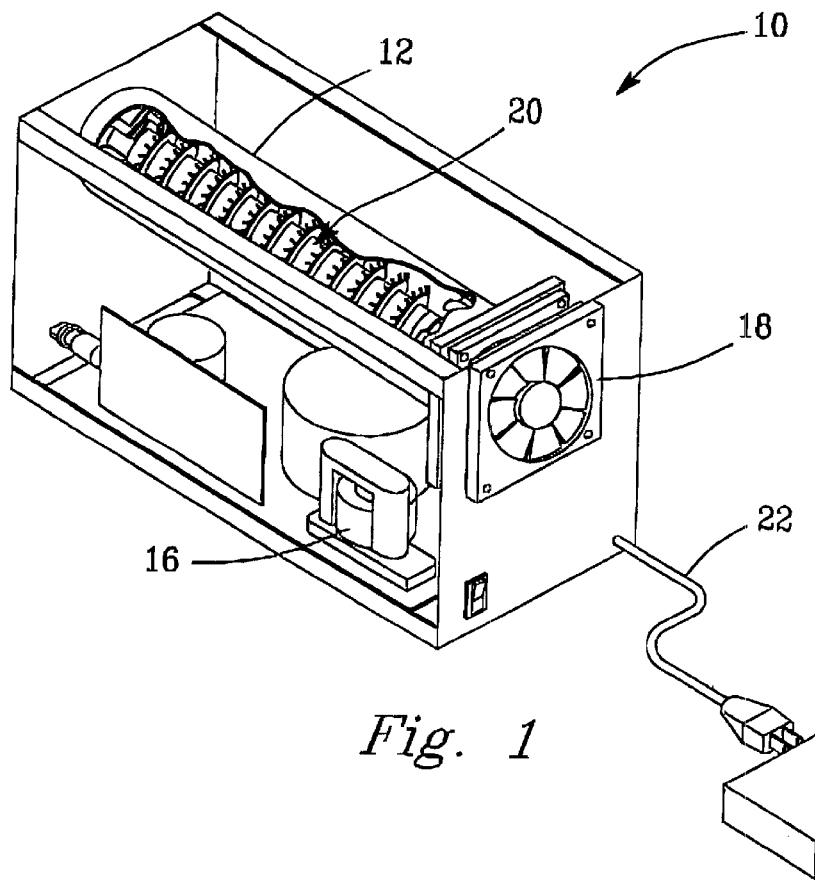
FIG. 1 is a schematic representation of the ozone generator of the present invention.

FIG. 1 illustrates the ozone generator of the present invention. As illustrated therein, the ozone generator 10 comprises, generally, a tubular (cathode) housing 12, a power supply 14, power controller 16, fan 18 and an anode assembly 20. More specifically, power is supplied to the generator 10 through conventional wiring 22, with the apparatus of the present invention being adapted to use standard 120V AC current. Alternatively, those skilled in the art can adapt the apparatus of the present invention for use with other electric sources, such as 220V AC.

The power controller 16 may be conventional electronics circuitry (not shown) which will be well known to those skilled in this art.

Figure 2:
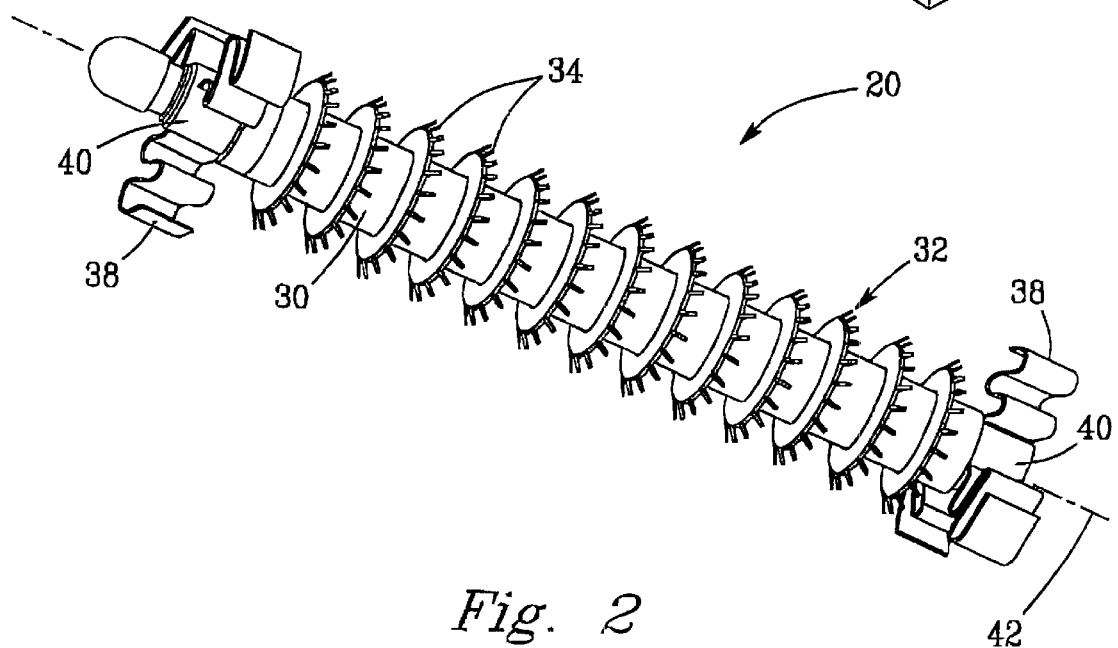
FIG. 2 is a schematic representation of the anode assembly of the present invention.

As illustrated in greater detail in FIG. 2, the anode assembly 20 comprises a first electrode having a central core 30, a plurality of vane assemblies 32 disposed along the length of the core 30, each with a plurality of vanes 34 thereon. The anode assembly 20 is disposed co-axially within a second electrode (or cathode) 12, with the co-axial relationship maintained by a plurality of insulators 38 therebetween. While the embodiment disclosed herein has a stationary anode assembly, a ring portion of the insulators 38 may be provided as ring bearing units 40 permitting the core 30 and vane assemblies 32 to rotate about the longitudinal axis 42 within the cathode 12. The embodiment illustrated herein comprises a tubular cathode 12 surrounding the anode assembly 20; it will be apparent to those skilled in this art that the polarity of the anode/cathode disclosed herein may be reversed between the tubular cathode 12 and the anode assembly 20.

Although the embodiment of FIG. 2 illustrates the vane assemblies 32 to be discrete entities disposed radially about the central core 30 in a plane at a right angle to the longitudinal axis 42, such arrangement is not required as long as the vanes 34 are maintained at a relatively constant distance from the cathode 12. For example, the vane assemblies 32 could be arranged in a continuous spiral about the central core 30 as illustrated in FIG. 3B. The number of such vane assemblies 32 will be determined by those skilled in this art depending upon the voltage to be applied, the amount of air flow or ozone to be produced, and other considerations.

Figure 3A:
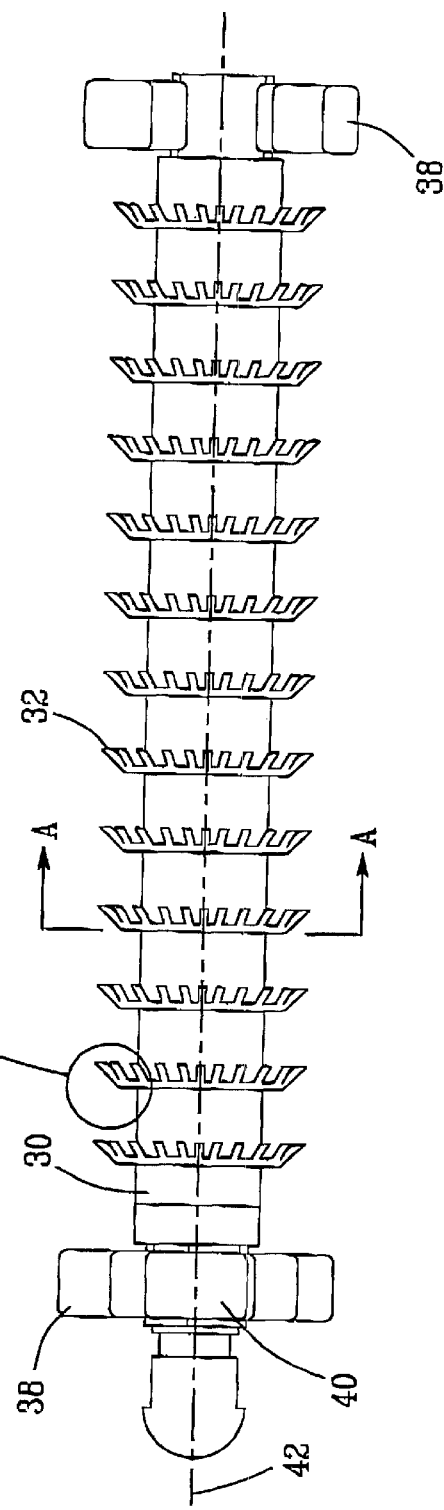
FIG. 3A is a longitudinal sectional view of a first embodiment of the anode assembly of FIG. 2.
Figure 3B:
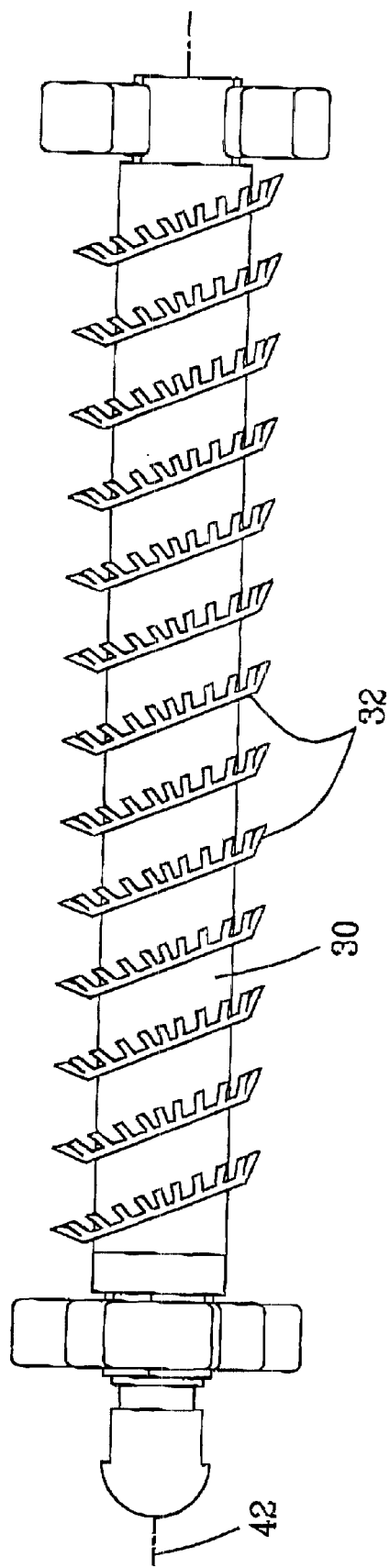
FIG. 3B. is a longitudinal sectional view of a second embodiment of the anode assembly of FIG. 2.

FIG. 3A illustrates a first embodiment showing equal spacing of individual, discrete vane assemblies 32 along the core 30. Essentially the entire length of the core is provided with vanes. It is to be appreciated that various embodiments of the vane assemblies are possible; it is not critical that the spacing between vane assemblies 32 be uniform or equal. The spacing will be dictated by the amount of ozone to be produced, size limitations of the overall unit, manufacturing constraints, and other factors that will be evident to those skilled in this art.

Figure 4:
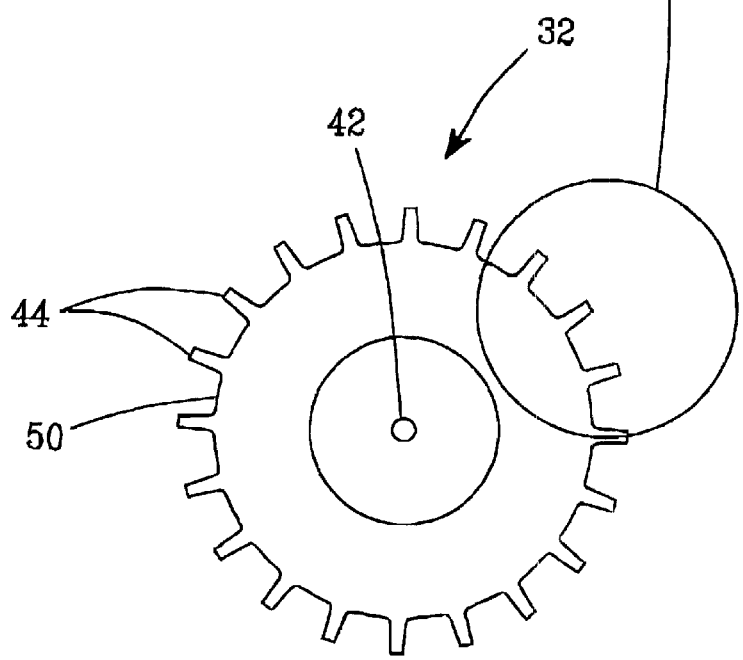
FIG. 4 is a cross-sectional view taken along lines A—A of FIG. 3.

In the embodiment of FIG. 4, each vane assembly 32 comprises a plurality of individual vanes 44 emanating from the planar surface 50 of the vane assembly and spaced equidistant from one another about the central core 30. Again, the exact number and spacing of the individual vanes will be determined by those skilled in the art.

Figure 5:
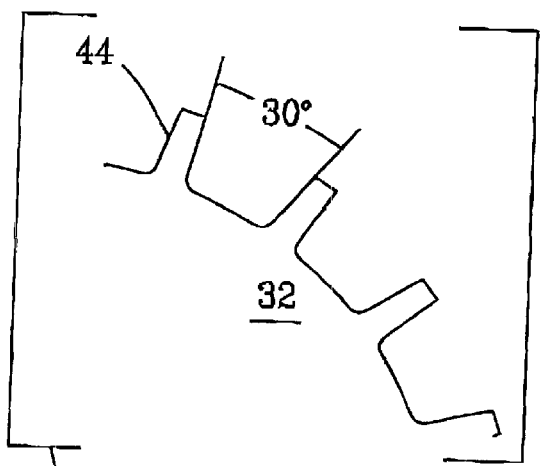
FIG. 5 is a detail view of the individual vanes.

The vanes 44 are preferably configured such that an inclusive angle of 30° (illustrated at 46 in FIG. 5) is achieved between adjacent surfaces of adjacent vanes.

Figure 6:
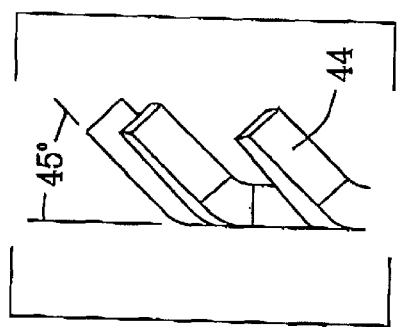
FIG. 6 is a schematic representation of the alignment of the vanes relative to the surface of the anode assembly.

Further vane 44 detail is provided in FIG. 6. The individual vanes 44 are canted at an angle of from about 15° to about 70°, and preferably about 45°, to a line tangent to the outer (radial) surface of the planar surface 50.

The fan 18 is illustrated in FIG. 2 as located such that air flow through the tubular cathode 12 and across the vane assemblies 32 will be longitudinal, or roughly parallel to the longitudinal axis 42. Air flow into the device may be also be provided by a pressure feed system (not shown). However, it is believed that providing tangential air flow to the assembly (that is, air flow at an acute angle to the longitudinal axis 42) will provide greater efficiencies of ozone production.

It is to be understood that while the core assembly and the vane assemblies are illustrated herein as generally circular structures, such components may take on different geometric shapes in particular situations.

EXAMPLE

An ozone generator was constructed as set forth above, and in FIGS. 1–6. Ambient air was provided to the apparatus longitudinally with a fan positioned as illustrated in FIG. 1. The apparatus was tested at air flow rates of from 0 SLPM (Standardized Liters Per Minute) to 20 SLPM, in increments of 1.0 SLPM. Voltage supplied to the apparatus was measured at 0%, 33%, 66% and 100%. Air volumes passing through the device was approximately 80 Normal cubic meters per hour. Ozone concentration in the off-gas from the device is believed to be approximately 0.01% by weight of ozone per weight of gas, or approximately 100 ppm. Productivity of the unit is approximately 10 grams of ozone per hour.

It is to be understood that while the invention above has been described in conjunction with preferred specific embodiments, the description and example are intended to illustrate and not limit the scope of the invention. Accordingly, the scope of this invention should be considered to be limited solely to the scope of the appended claims.

We claim:

1. An ozone generator apparatus, comprising a cathode assembly and anode assembly, one of said cathode or anode assemblies comprising a. a central core comprising one electrode having a longitudinal axis;

b. a vane assembly disposed radially about the central core; p1 c. said vane assembly comprising a plurality of individual vanes disposed about the periphery of a planar surface of the vane assembly;

d. each of said individual vanes disposed at an angle of from 15° to 70° to a line tangent to the radial surface of said planar surface;

e. said other assembly comprising a tubular electrode surrounding said one of said cathode or anode assemblies.

2. The ozone generator apparatus of claim 1, wherein the individual vanes are disposed at an angle of 45°.

3. The ozone generator apparatus of claim 1, wherein said apparatus further comprises a fan disposed to direct air flow through said tubular member and along said longitudinal axis.

4. The ozone generator apparatus of claim 1, wherein said apparatus further comprises a fan disposed to direct air flow tangentially through said tubular member and along said longitudinal axis.

\* \* \* \* \*